Dec. 2, 1958     C. E. JOHNSTONE     2,863,037
ELECTRIC COFFEE CUP
Filed April 18, 1956

INVENTOR.
Cyrus E. Johnstone
BY
Thos. E. Scofield
ATTORNEY.

United States Patent Office 2,863,037
Patented Dec. 2, 1958

2,863,037

ELECTRIC COFFEE CUP

Cyrus E. Johnstone, St. Joseph, Mo.

Application April 18, 1956, Serial No. 579,056

5 Claims. (Cl. 219—43)

This invention relates to an electrically self-heating drinking cup for coffee and like beverages, and refers more particularly to such a cup having means for shielding the lip and handling portions thereof from excessive heating and cooperating with a base to control the current supplied to the heating means in the cup by the quantity of fluid in the cup.

An object of the invention is to provide an electrically self-heating drinking cup wherein the lip receiving portions on both the inner and outer sides of the top edge of the cup and the handling portion thereof are shielded from excessive heating whereby said cup can be formed of metallic heat conducting material having strength, durability, lightness of weight and appearance advantages over conventional such devices.

Another object of the invention is to provide a double-walled drinking cup of heat conducting material, an electrical heating unit being attached to the inner wall thereof, means being provided whereby the entire outer wall and the entire lip receiving surface of the cup, including an area contained within the cup fluid holding portion itself are maintained essentially at room temperature while the contents of the cup may be brought to a boil and/or maintained in a heated condition.

Another object of the invention is to provide such an electrically operated drinking cup having means provided therein whereby to indicate fluid filling levels for beverage preparation wherein the beverage material and fluid are added to the cup and heated to the desired level and then extra fluid is added as measured by the indicating means to permit immediate drinking after preparation of the beverage.

Another object of the invention is to provide an electrically self-heating drinking cup having an electrical heating element in the base thereof, the heating element so cooperating with the portion of the cup to be heated that the heating element itself may be operated at a relatively low temperature, thereby simplifying the insulation problem of the lip receiving portions and handling portions of the cup.

Another object of the invention is to provide an electrically operated, self-heated drinking cup assembly comprising a cooperating cup and base unit whereby the electrical heating element in the cup is not actuated unless the cup is set on the base and filled to a certain level with fluid, thereby obviating the possibility of burning out the heating element in the cup or overheating the cup itself.

Another object of the invention is to provide such a cup and base assembly wherein the electrical contacts in the base unit which cooperate with and engage electrical leads in the cup itself leading to the heating element in the cup are fully protected from the possibility of manual contact by the user and also from liquid overflow or spillage from the cup when positioned on the base itself.

Another object of the invention is to provide such an electrically operated, self-heating drinking cup and base assembly which may be operated on the conventional dwelling place electrical supply or may be adapted to use in automobiles and the like by varying the heating element resistance and shape of the connection of the electric extension cord, whereby to plug into automobile lighter sockets and the like.

Yet another object of the invention is to provide such an electrically operated, self-heating drinking cup and base assembly wherein the electrical connections between the cup itself and the base are so constructed as to permit setting the cup on the base in any position and moving the cup in rotary motion on the base itself whereby the cup may be manipulated on the base for easier grasping of the handle thereon and does not need careful maneuvering to engage the electrical contacts between the base and the cup when the cup is returned to the base.

Still another object of the invention is to provide such a self-heating, electrically operated drinking cup and base assembly wherein the electrical leads on the cup which are provided to engage the electrical contacts in the base portion are recessed into the bottom of the cup whereby to protect the connections themselves from damage and also improve the aesthetic appearance of the cup itself.

Other and further objects of the invention will appear in the course of the following description thereof.

Referring to the drawings, which form a part of the instant specification and are to be read in conjunction therewith, embodiments of the invention are shown therein and, in the various views, like numerals are employed to indicate like parts.

Figure 1:
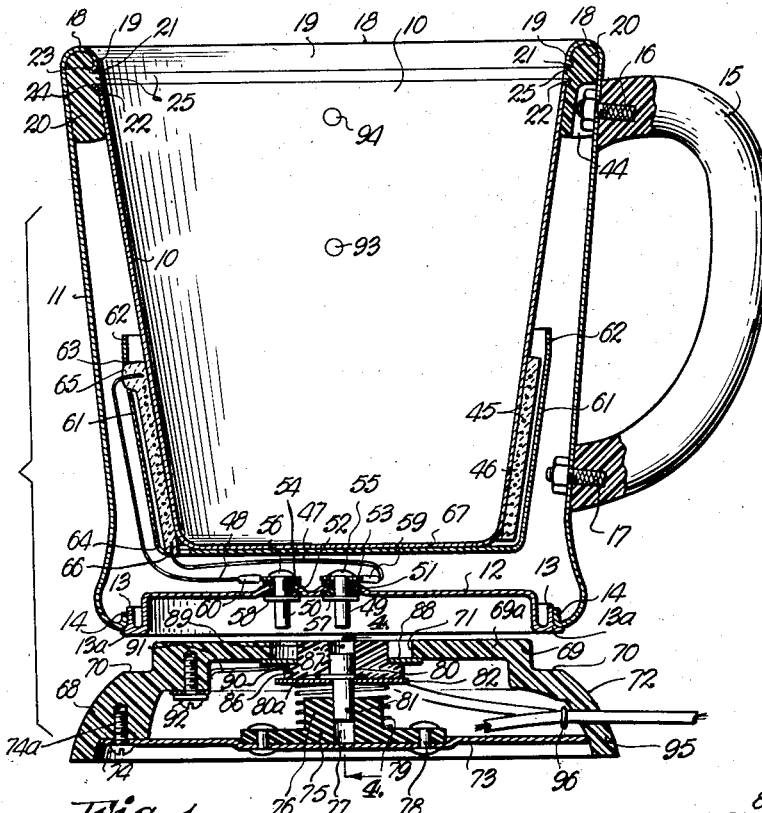
Fig. 1 is a side-sectional view of the inventive cup-base combination showing the cup poised over the base prior to mounting thereon.

Referring to the drawings, at 10 is shown the inner wall of a double walled vessel formed preferably of a light metal such as aluminum. Inner wall 10 forms a fluid receiving cup of itself adapted to hold a quantity of liquid such as coffee. Both surfaces of inner wall 10 are preferably polished to a bright finish excepting where it contacts the heater and shield to be later described. Outer wall 11 encloses at least the lower portion of the outer surface of the inner wall 10 and is spaced away from said lower portion out of contact therewith by virtue of its greater diameter. Both surfaces of outer wall 11 are preferably polished also to a bright finish to match that of the inner wall. The bottom portion 12 of outer wall 11 is preferably inwardly dished and removable from the outer wall to permit access to the space between the inner and outer walls for assembly, repairs to the heating unit, etc. Bottom portion 12 may be fixed to the outer wall 11 in any desired fashion but preferably is merely friction fitted therein with outer flange 13 abutting inwardly turned lower lip 14 of outer wall 11. The bottom portion 13a of flange 13 is preferably formed flat to serve as a seating base for the cup. Handle 15 is fixed to the outer wall 11 by bolts 16 and 17 which penetrate formed openings in the outer wall.

Figure 5:
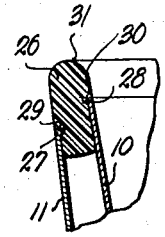
Fig. 5 is a fragmentary side-sectional view of the lip receiving portion of the cup showing a first modified form of the top edge of the cup construction.
Figure 6:
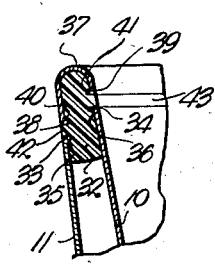
Fig. 6 is a view similar to that of Fig. 5 showing a second modified form of the construction of the lip receiving portion of the top cup edge.
Figure 4:
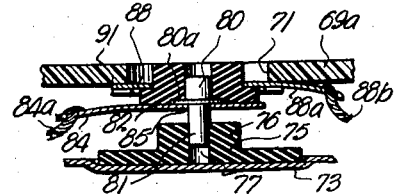
Fig. 4 is a view taken along the lines 4—4 of Fig. 1 in the direction of the arrows.
Figure 3:
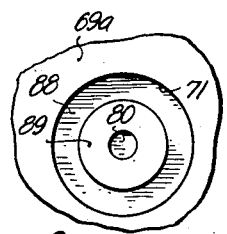
Fig. 3 is a fragmentary plan view of the central top portion of the base.
Figure 2:
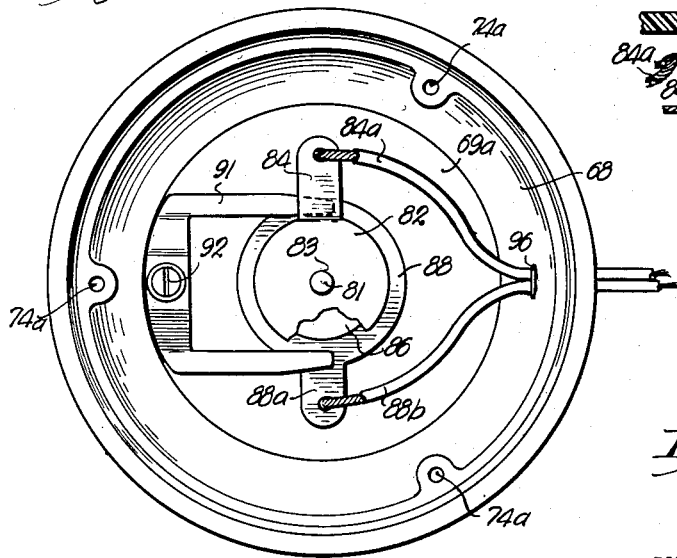
Fig. 2 is a bottom plan view taken of the base portion of Fig. 1 with the bottom plate 73 removed therefrom.

Insulating means join the outer and inner walls whereby the upper portion of the cup, the topmost edge thereof, and at least a portion of the inside upper surface of the cup have no uninsulated contact with said inner wall portion which holds the fluid. Figs. 1, 5 and 6 show three modifications of the construction joining the insulating means to the inner and outer walls. Fig. 1 shows the preferred means because such a modification gets the total desired insulation effect and permits a minimum exposure of the insulating material itself.

In the modification of Fig. 1, the outer wall has inwardly curved circumferential upper portion 18 which overlies the upper end of the inner wall 10 whereby the upper outer surface of the outer wall, the topmost surface of the upper portion 18 and the outer surface of the depending portion 19 thereof form the top lip receiving portion of the cup. Circumferential band 20 of insulating material is preferably formed of moldable, thermosetting plastic material (such as polyester or phenolic) and spaces the outer and inner walls one from the other and is connected thereto adjacent their free ends by flanges 21 and 22 on the outer and inner walls respectively, fitting into grooves 23 and 24 formed in the inner face of the insulating band. Cementing material of conventional type may also be employed to aid in fixing the outer and inner walls to the insulating material 20. A flange 25 of insulating material extends between the edges of the outer wall and inner wall and lies flush with the faces thereof.

In the modification of Fig. 5, the insulating means joining the upper edges of the inner and outer walls comprises a circumferential band 26 formed of insulating materials similar to that of band 20 in Fig. 1 engaged intermediate its upper and lower edges by the upper edges of the inner and outer walls preferably by flanges 27 and 28 engaging grooves 29 and 30 in the outer and inner faces, respectively, of band 26. The portion of band 26 overlying the upper edges of the outer and inner walls is preferably of greater thickness than that portion thereof engaged by the walls so the outer and inner faces of the band 26 preferably lie flush with the outer and inner surfaces of outer and inner walls 11 and 10. The upper surface 31 of band 26 is preferably rounded.

In the modification shown in Fig. 6, the lower portion of insulating band 32 is formed the same as in the Fig. 5 modification with flanges 33 and 34 on the outer and inner walls engaging grooves 35 and 36 in the insulating material outer and inner faces but the topmost portion of the insulating band 32 is covered by a curved ring 37 of metallic material of the same composition as that of the outer and inner walls 11 and 10, the ring 37 having flanges 38 and 39 engaging grooves 40 and 41 formed in the faces of the insulating band 32. In this modification, the only portions of the insulating material that show are the circumferential strips 42 and 43 of greatest thickness which extend preferably flush with the surfaces of the outer wall 11 and inner wall 10, respectively.

In Fig. 1 hollowed out portion 44 is shown formed in band 20 to receive the bolt 16 of handle 15 therein.

Means for electrically heating the inner wall 10 are fixedly attached thereto in the form of circumferential coil 45 set in ceramic ring 46. Insulated electrical leads 47 and 48 join the end wires of coil 45 to posts 49 and 50 extending through indented openings 51 and 52 in dished bottom portion 12. Opening 51 is preferably positioned centrally of essentially circular bottom portion 12. Washers 53 and 54 insulate posts 49 and 50 from the wall of dished portion 12. Heads 55 and 56 and flanges 57 and 58 fixedly mount posts 49 and 50 relative openings 51 and 52. Indented openings 51 and 52 permit flanges 57 and 58 to lie essentially flush with the bottom surface of dished portion 12. Connectors 59 and 60 join leads 47 and 48 to posts 49 and 50 and are insulated from the wall by washers 53 and 54. The tops 55 and 56 of posts 49 and 50 are spaced from the bottom of the inner wall. The extension of posts 49 and 50 below the dished portion of the lower outer wall is preferably less than the depth of the dished portion to protect posts and permit setting of the cup on the surfaces 13a without contact of the posts with a table or the like. Noncentral post 50 is preferably positioned opposite handle 15.

Heat reflecting and concentrating, preferably metal, screen or wall 61 is positioned circumferentially to coil 45 and preferably extends slightly thereabove. Ring 46 may also be cemented to inner wall 10. Openings 63 and 64 are formed in wall 61 to permit egress of electrical leads 47 and 48. Tabs 65 and 66 of ceramic material extending into openings 63 and 64 aid in insulating electrical leads 47 and 48 at their points of exit from the shield 61. Wall 61 is preferably fixed to outer lower surface of inner wall 10 as at 67 by brazing, spot welding, etc., as desired. The inner and outer wall 61 surfaces are polished and the wall serves to concentrate heat from the coil 45 on the inner wall and, in combination with the gap or spacing between the inner and outer walls, serves to insulate the outer wall from the heat produced by the coil. The gap between the walls may be filled with insulating material (not shown) such as Fiberglas to cut down convection currents.

The base for the inventive drinking cup-base combination comprises a hollowed out, rounded bottom portion 68, preferably made of insulating molded, thermosetting plastic, of greater outer diameter than the dished portion 12. Formed centrally of bottom portion 68 is upwardly extending circular portion 69 for receiving posts 49 and 50. Central portion 69 is of slightly less outer diameter than the inner diameter of the inwardly dished portion 12 and is of slightly less height than the depth thereof to fit therein. Shelf portion 70 at the top of the bottom portion 68 receives the flat portion 13a of the cup bottom. Orifice 71 is formed centrally of circular portion 69. The bottom portion 68 is at all points lower than the upwardly extending circular portion 69 and has downwardly curved side walls 72 whereby to shed liquid spilled thereon. Shelf portion 70 is preferably essentially equal to or slightly less than the width of the nondished portion of the cup base.

It is desirable to provide electrical contact means in the base 68 which will not complete the power circuit to the cup heater unless certain excess of weight over the weight of the cup empty is carried thereby. This prevents overheating coil 45 when there is no heat receiving medium (liquid) in the cup or overheating the inner wall 10 with possible discoloration or deformation thereof. Such contact means automatically turn off the current when the liquid level in the cup falls below a certain level and also prevents boiling away the remaining liquid in the cup.

Referring to base 68, plate 73 is fastened to the underside thereof by screws 74, in openings 74a. Insulating spring mounting platform 75, having upwardly extending spring receiving hub 76 with opening 77 therein, is fixed to plate 73 by rivets or bolts 78. Resilient spring 79 is mountable on platform 75 with the internal diameter of the spring being slightly greater than the outer diameter of hub 76. Central cylindrical post 80, having lower portion 81 slip fitting opening 77, is encircled by electricity conducting, circular plate 82 having opening 83 therein and electrical contact arm 84 thereon. These parts are so sized that plate 82 bottoms on the top of hub 76 before the base of pin 81 bottoms on plate 73, thus preventing any contact therebetween. Weld 85 fixes plate 82 to the underside of the enlarged portion of post 80 and enlarged portion 80a abuts the topside of plate 82 thereby fixedly attaching the plate 82 to the post. Spring 79 abuts the bottom side of plate 82. Single insulated electrical lead 84a engages arm 84 so current may pass from plate 82 to post 80. Mounted on top of plate 82 is secondary insulating platform 86 having central post 80 receiving orifice 87 therein extending therethrough and receiving the enlarged upper portion of cylindrical post contact 80.

Circumferential outer electrical contact ring 88 comprises a flat ring encircling the top portion 89 of secondary platform 86 and riding on shelf 90 thereof. Contact ring 88 has a greater outer diameter than opening 71 in base portion 69 thereby to abut the lower edge of the underside of base portion 69 to limit the upward motion of spring 79 and parts supported thereby. Ring 88 has electrical contact arm 88a thereon with single insulated electrical lead 88b engaging arm 88a so current may pass to ring 88. Electrical leads 84a and 88b are spaced on opposite sides of base 68 whereby contact arms 84 and 88a are also opposite one another. Secondary platform 86 insulates post 80 and its electrical contacts from contact ring 88 and its electrical leads. Only simultaneous contacting of posts 49 and 50 with recessed post 80 and ring 88, respectively, will complete the power circuit. Divided leaf spring 91 is fixed to the underside of base 68 by screw 92, the divided arms thereof engaging the underside of contact ring 88 and supporting the same upwardly against the underside of the base portion 69. The thickness of the top shelf 69a of base portion 69 is preferably just very slightly less than the length of posts 49 and 50 on the cup. The height of the enlarged upper portion of post 80 is greater than the height of shelf 90 plus the contact ring 88 so the top of the post 80 is normally positioned above contact ring 88. The height of the top portion 89 of secondary platform 86 is equal to the thickness of the top shelf 69a plus the thickness of contact ring 88 so that when the secondary platform 86 is at its normal highest position the top surface of top portion 89 will be flush with the top surface of the top shelf 69a.

The centering of all of the spring supported parts centrally positioned of circular base 68 is accomplished by the rivets or bolts 78 fixing spring mounting platform 75 to the indented portion of plate 73. Platform 75 serves to center the central electrical contact post 80 and the coil spring 79. Plate 82, secondary platform 86 and contact ring 88 are all mounted relative the central electrical contact post 80 which has the lesser diameter portion 81 thereof slidably mounted in orifice 77 of spring mounting platform 75.

Lower and upper fluid level indicating markers 93 and 94 are plastic tabs sealed in the inner wall 10. The purpose of these markers is to expedite immediate consumption of the beverage after it is prepared in the cup. Thus, in the instance of coffee, instant coffee or the like is added with water to the level of the first indicating marker 93. The cup is placed on the base and the mixture brought to a boil. Cool water is then added up to the level of the second indicating marker 94 to reduce the temperature of the mixture to drinking heat. The relative heights of the two indicating markers on the wall of the cup depends upon the volume of the cup itself.

In operation, the cup may be placed on the base 68 without any fluid therein. Since central post 80 is carried at a greater height than contact ring 88, central post 49 in the bottom of the cup will first contact the top of the post 80. The weight of the cup alone without any fluid therein is insufficient to depress the coil spring 79 and, therefore, the cup tilts around the single central support point toward the handle side of the cup. This is due, as previously noted, to the weight of the handle. Therefore, it will be seen that while no liquid is in the cup, the cup will rest on the base supported by the flange 13a on the handle side resting on shelf 70 on the base and pin 49 resting on the top of central post 80 without depression of the coil spring 79. When a fluid such as water, with or without beverage mixture such as coffee or tea, is poured into the cup itself to any desired predetermined level, preferably a level essentially equal to or slightly higher than the level reached by the coil 45, the weight of the cup plus the added liquid will be sufficient to depress the coil spring 79, thus permitting post 80, plate 82 and secondary platform 86 to move downwardly as the lower portion 81 of the post 80 slides into the recess 77. Contact ring 88 is maintained abutting the underside of the top wall 69a of the base 68. As the support for the pin 49 moves downwardly under the added weight, the cup itself tilts around the pivot point 13a adjacent the handle and post 50 comes into contact with the contact ring 88 thus completing the circuit from the electrical leads into the base through the post 80 and contact ring 88 into the posts 49 and 50 through the electrical leads in the cup 47 and 48. The coil 45 then heats up and raises the temperature of the lower portion of the inner wall 10. The metal reflecting wall or screen 61 aids in insulating the lower portion of the outer wall 11 from the heat applied to the inner wall 10. The plastic insulating material circumferential bands 20, 26 or 32, depending upon what modification in the Figs. 1, 5 or 6 is employed in the cup, prevents conduction of heat from the inner wall 10 upwardly to the top portion of the outer wall 11. Since the only contact between the inner and outer walls 10 and 11 is at the top connection through the insulating bands 20, etc., the outer wall remains essentially at room temperature while the inner wall is heated to raise the temperature of the liquid contained in the inner wall cup structure. As previously mentioned, the beverage making levels as indicated by the markers 93 and 94 will permit swift beverage concoction and immediate drinking thereof.

Once the level of the liquid within the inner wall 10 has dropped below the predetermined level necessary to actuate the spring 79 to permit the posts 49 and 50 to complete the circuit between posts 80 and contact ring 88, the reverse process of the contacting procedure will take place. Thus, when the cup is set on the base with less liquid than the required predetermined amount, the cup will settle to the handle side and be supported as previously described. However, if the cup is set on the base with just a slightly greater amount of liquid than that required to depress the spring 79, the contact will be made and heat will be applied to the inner wall 10, thus raising the liquid to a boil. After enough liquid has boiled away from the quantity in the cup to lower the level below the predetermined level, the spring 79 will automatically push plate 82, post 80 and secondary spring platform 86 upwardly, raising the cup. Since the handle side is heavier the cup will tend to settle toward the handle side as it raises and the contact 50 will be broken with the contact ring 88. This will stop the application of heat to the inside bottom portion of the inner wall and no further boiling of the liquid or heating of the cup will occur, thus providing an automatic safety regulation of the cup.

The insulated electrical extension wires exit from the base 68 through preferably sealing opening 95 therein. Strain relief ring 96 preferably encircles the insulated wires immediately adjacent the inside of the base.

It should be noted that the cup itself may be placed upon the base 68 from any position due to the fact that the centrally located extension upwards of the secondary platform 86 within the orifice 71 in the top portion 69a of the base creates a circumferential groove or track surrounding the central opening 87 in the upwardly extending portion 89 of secondary platform 86. Thus, once pin 49 is fitted into the opening 87, the pin 50 may fit anywhere circumferential thereto in the track or groove formed by the upwardly extending portion 89 being centrally located in the opening 71. It is evident also that the cup may be rotated while sitting on the base, the post 49 rotating in the orifice 87 and the post 50 moving in the circumferential groove or track. The widths of the opening 87 and track are slightly greater than the diameters of the pins 49 and 50, respectively, to permit easy insertion thereof therein.

As to the material for making the cup and the metallic screen 61, aluminum or aluminum alloys are undoubtedly the easiest materials to form. Aluminum resists corrosion and may be finished with very high infrared (heat) reflectivity. Aluminum conducts heat nearly as well as copper and can be plated easily with any metal. It may be desirable to plate some cups with metal such as copper or gold. The cup of this metal can be anodized and dyed any color and is also very light weight and cheap. This listing of the benfits and uses of aluminum and its alloys is not intended to exclude the use of any other material such as steel, copper, etc., but merely to indicate a preferred composition.

From the foregoing it will be seen that this invention is well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter hereinabove set forth or shown in the accompanying drawings is to be interpreted as illustrative and not in a limiting sense.

Having thus described my invention, I claim:

1. A drinking cup assembly comprising a double-walled vessel having an inner wall formed to receive a quantity of fluid therein, an outer wall enclosing at least the lower portion of the outer surface of said inner wall, said outer wall spaced away from the lower portion of the inner wall and out of contact therewith, insulating means joining the outer and inner walls whereby the upper outside surface of the cup, the topmost edge thereof, and at least a portion of the inside upper surface of the cup has no uninsulated contact with said inner wall, means for electrically heating said inner wall attached thereto, electrical connections to said heating means extending outwardly from said outer wall, the bottom portion of the outer wall being inwardly dished and the electrical connections extending outwardly from said dished portion, the dished portion being essentially circular and one electrical contact being positioned centrally of the dished portion, a base for said cup comprising a rounded bottom portion of greater diameter than the dished portion of the cup bottom, an upwardly extending circular portion on said bottom portion of slightly lesser diameter than the diameter of the dished cup bottom portion, a central orifice in the upper base portion to receive the central lead in the cup bottom, a track in the upwardly extending base portion circumferential to the central orifice to receive the noncentral lead in the cup bottom, a post in said central base orifice having a single electrical connection thereto, resilient means in said base maintaining said post in said orifice at a level below the mouth of the orifice less than the length of the central electrical connection extension below the outer wall of the dished portion in the cup bottom, a plate in said base forming the bottom of said track having another electrical connection thereto, the level of said plate in said track and base being below that of the top of said post, the electrical connections extending from the bottom of the cup being essentially of the same length, the noncentral electrical connection in the cup being diametrically opposed to the handle of said cup, the handle weight being sufficient, when the cup is empty, to tip the cup, when supported only by the central electrical connection, to the side of the handle, the strength of the spring under the central post in the base being sufficient to support the weight of the cup plus some additional weight without depression of said post against its supporting resilient means.

2. A drinking cup assembly as in claim 1 wherein the height of the upwardly extending portion of the base is greater than the distance from the mouth of the orifice to the top of the post as maintained by its resilient means.

3. A drinking cup assembly as in claim 1 wherein the height of the upwardly extending portion of the base is greater than the distance from the mouth of the orifice to the top of the post as supported by its resilient means and the plate in the track has resilient means thereunder to permit depression thereof, the distance from the top of the plate to the top of the track being greater than the distance from the top of the post to the top of its orifice, and the former distance being less than the height of the upwardly extending portion of the base.

4. A drinking cup assembly comprising a double walled vessel having an inner wall formed to receive a quantity of fluid therein, an outer wall enclosing at least the bottom portion of the outer surface of said inner wall, said outer wall spaced away from the lower portion of the inner wall and out of contact therewith, means connecting the outer and inner walls, means for electrically heating said inner wall attached relative thereto, the bottom portion of the outer wall being inwardly dished, a first and a second electrical lead post, each post connected to said heating means and extending outwardly from said dished portion of said outer wall, a base for said cup, said base comprising a lower portion of greater area than the dished portion of the cup, an upwardly extending portion on said lower portion of slightly lesser area than the area of the dished portion of the cup and formed so as to fit within said dished portion, a first orifice in the upper base portion to receive the first lead post of the cup therein, a second orifice in the upper base portion operable to receive the second lead post therein, a first electrical contact within the first orifice, a second electrical contact within the second orifice, said contacts operable in concert with the cup lead posts to make and break an electrical circuit when the cup is placed on the base with the posts in the orifices and each post is in contact with the corresponding electrical contact, electrical leads from said contacts attachable to an electrical power source, one of said contacts spaced below the upper surface of the base a distance less than the length of the cup lead post operable to contact it, resilient means in said base underlying said last contact of such strength as to support the weight of the cup plus some additional weight without depression, and weight biasing means on said cup to prevent touching of the other contact and its corresponding cup lead post when the cup is on the base and said resilient means is not depressed.

5. A drinking cup assembly comprising a double walled vessel having an inner wall formed to receive a quantity of fluid therein, an outer wall enclosing at least the bottom portion of the outer surface of said inner wall, said outer wall spaced away from the lower portion of the inner wall and out of contact therewith, insulating means joining the outer and inner walls, means for electrically heating said inner wall attached relative thereto, the bottom portion of the outer wall being inwardly dished, a pair of electrical lead posts each connected to said heating means and extending outwardly from said dished portion of said outer wall, the dished portion in the bottom of the outer wall being circular, one electrical lead post extending therefrom being centrally positioned in said dished portion, the other post being radially offset therefrom, a base for said cup, said base comprising a lower portion of greater area than the dished portion of the cup, an upwardly extending circular portion on said lower portion of slightly lesser diameter than the diameter of the dished portion of the cup, a central orifice in the upper base portion to receive the central lead post of the cup therein, a circular track in the upper base portion circumferential to the central orifice to receive the noncentral lead post therein, a first electrical contact in the base of the orifice, a second electrical contact within the entire track, said contacts operable in concert with the cup lead posts to make and break an electrical circuit when the cup is placed on the base with the central post in the orifice and the other post anywhere in the track and each post in contact with the corresponding electrical contact, electrical leads from said contacts attachable to an electrical power source, said first contact spaced below the upper surface of the base circular portion a distance less than the length of the central cup lead post, resilient means in said base underlying said first contact of such strength as to support the weight of the cup plus some additional weight without depression, and weight biasing means on said cup to prevent touching of the other contact and its corresponding cup lead post when the cup is on the base and said resilient means is not depressed.

References Cited in the file of this patent

UNITED STATES PATENTS

| | | |
|---|---|---|
| 1,378,256 | Malhomme | May 17, 1921 |
| 1,757,253 | Lacy | May 6, 1930 |
| 2,033,468 | Gruenberg | Mar. 10, 1936 |
| 2,223,780 | Carathers | Dec. 3, 1940 |
| 2,528,191 | Turner | Oct. 31, 1950 |
| 2,701,296 | Crawford | Feb. 1, 1955 |
| 2,703,358 | Mertler | Mar. 1, 1955 |

FOREIGN PATENTS

| | | |
|---|---|---|
| 43,427 | France | Mar. 5, 1934 |
| 89,015 | Switzerland | Apr. 16, 1921 |
| 92,685 | Austria | May 25, 1923 |
| 292,734 | Switzerland | Nov. 16, 1953 |
| 479,907 | Great Britain | Feb. 11, 1938 |
| 585,928 | Germany | Oct. 17, 1933 |